No. 859,829. PATENTED JULY 9, 1907.
O. N. McCORMICK & W. A. CORTNER.
STOCK FOUNTAIN.
APPLICATION FILED SEPT. 6, 1906.
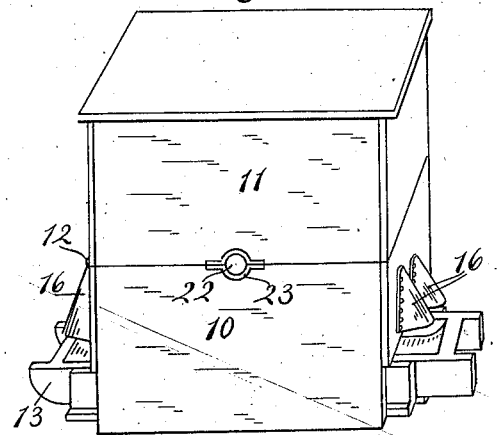
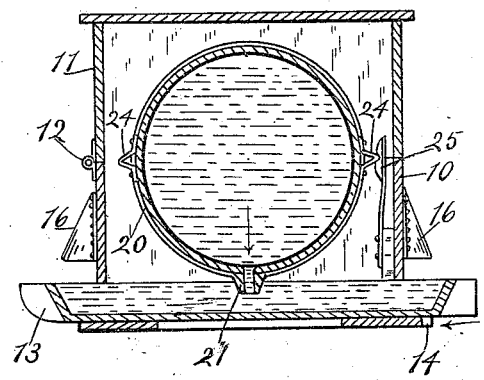
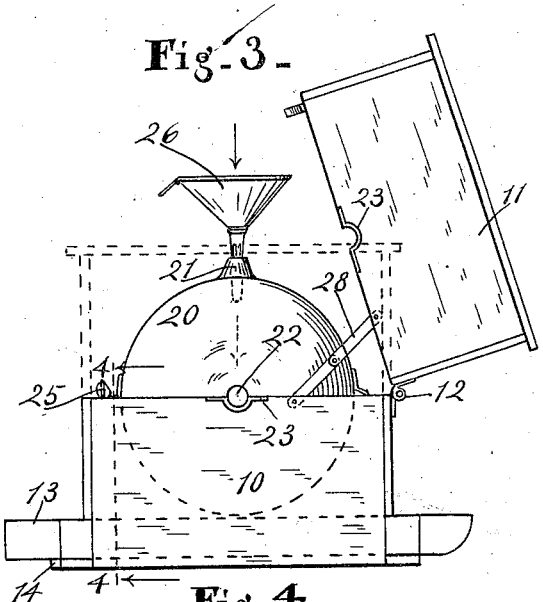
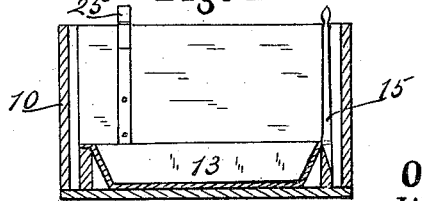
WITNESSES:
N. Allmong
W. M. Gentle
INVENTORS.
Ora N. McCormick and
William A. Cortner.
BY
V. H. Lockwood
ATTORNEY.

UNITED STATES PATENT OFFICE.

ORA N. McCORMICK AND WILLIAM A. CORTNER, OF FARMLAND, INDIANA; SAID CORTNER ASSIGNOR TO SAID McCORMICK.

STOCK-FOUNTAIN.

No. 859,829.

Specification of Letters Patent.

Patented July 9, 1907.

Application filed September 6, 1906. Serial No. 333,431.

*To all whom it may concern:*

Be it known that we, ORA N. McCORMICK, of Farmland, county of Randolph, and State of Indiana, and WILLIAM A. CORTNER, of Farmland, county of Randolph, and State of Indiana, have invented a certain new and useful Stock-Fountain; and we do hereby declare that the following is a full, clear, and exact description thereof, reference being had to the accompanying drawings, in which like letters refer to like parts.

The object of this invention is to provide an improved stock fountain wherein the tank is rotary and is provided with only one opening into which the water is introduced and through which it escapes, thus rendering the tank convenient to fill and to put into its discharging position and easy to keep the tank airtight. Combined with such rotary tank we provide a box or casing in which it is mounted and means for holding it with the opening therein at the top for filling the tank and holding it with the opening down for discharging, and also providing in said casing under said tank a removable trough into which said tank discharges so arranged that, while in the discharging position, the outlet of the tank is slightly lower than the top of the trough, whereby when the trough is filled the level of the water rises above the lower end of the outlet of the tank and provides a water-seal that prevents the inlet of air in the tank. As the water in the trough is consumed to a level below the lower end of the tank outlet, it will permit air to enter until some more water is discharged. The removable trough can be easily cleaned and its ends extend beyond the sides of the casing far enough to give the stock access to the two ends of the trough.

The nature of this invention and the details thereof will be more fully understood from the accompanying drawings and the following description and claims:

In the drawings, Figure 1 is a perspective view of the entire device. Fig. 2 is a central longitudinal vertical section therethrough, showing the tank in its discharging position. Fig. 3 is a side elevation with the top of the casing opened and turned back and the tank in its filling position and with a funnel for filling the same, the closed position of the top and the position of the other parts being shown by dotted lines and the animal separating projections being omitted. Fig. 4 is a transverse vertical section on the line 4—4 of Fig. 3.

We do not wish to be limited to the details of construction of the device herein shown, which, while it represents the form of invention that we have heretofore constructed, is shown here for the purpose of illustrating the nature of our invention. Therein appears a casing consisting of a lower portion 10 rectangular in form with a top 11 similar in form, the top being hinged to the lower portion by the hinges 12 at one end, as appears in Figs. 2 and 3. The ends of the lower portion of the casing are provided with an opening near the bottom for the trough 13. This trough is longer than the casing so that the two ends thereof protrude far enough at each end of the casing to enable animals to drink at both ends thereof. The trough is readily removable from the casing and consists of a rectangular wooden frame and sheet metal secured thereto substantially as shown in Figs. 2 and 4. It is held in the casing from movement in one direction by the cross-bar 14 secured to the underside of the trough frame abutting against the bottom of the casing 10 and is locked from movement in the other direction by the wedge-shaped lower end of the bar 15 that is inserted by hand on the inside immediately against the end of the casing 10 into a corresponding notch cut in the side of the frame of the trough, as seen in Fig. 4. This trough may be held or locked in position by any other suitable means. We secure projections 16 at intervals to the ends of the casing extending over the ends of the trough to separate the hogs or animals while drinking from the trough and to keep them from getting into the trough bodily.

The tank 20 is cylindrical and air-tight excepting one outlet through the spout 21. On each end of the tank there is a spindle 22 that fits in the bearings 23 in the side of the casing 10 so that the tank will be rotatable in said casing. On opposite sides of the tank and 90 degrees from the spout 21 there are stop lugs 24 secured, adapted to engage a spring catch 25 that is secured to the inner surface of one end of the casing 10. This catch consists of a spring bar with a notch in the face thereof near the upper end to receive one of the lugs 24. The catch holds the tank in its filling position, as seen in Fig. 3 with its spout uppermost or in the discharging position, as seen in Fig. 2 with the spout downward. The tank is so mounted in the casing, with relation to the trough that the end of the spout, when it extends downward, will project lower than the top of the sides of the tank and therefore below the level of the water when the trough is substantially full. A funnel 26 is shown in use in filling the tank but the tank may be filled in any other way.

The tank is first turned with the spout upward, as shown in Fig. 3, and filled with water, the air easily escaping upward through the spout. After the tank is filled it is turned quickly by hand one-half revolution, from the position shown in Fig. 3 to that shown in Fig. 2, with the spout downward and the tank is left in that position. The water will flow from the tank into the trough as rapidly as the air can enter the spout in the tank until the level of the water in the trough shall rise above the lower end of the spout and prevent air entering the tank. Thereafter no further water will flow from the tank into the trough until the water is lowered in the trough by consumption or otherwise. When the water in the trough is low enough to permit air to enter the spout 21 the water will again flow from the tank into the trough, whereby the water will rise high enough to shut off the air entering the tank. This action of the air and water is repeated as the level of the water in the trough is lowered until the tank is empty.

From the foregoing it is seen that we have provided a stock fountain with a rotary tank needing only one opening that is always open and requires no manipulation or change, the remainder of the tank being airtight. All that is necessary in operating the device is to rotate the tank one-half revolution and fill it, then rotate it back a half revolution to the discharging position. The spring catch automatically holds the tank in its two positions and releases the same as the tank is turned by hand. Animals can drink at either end of the trough and the trough is easily removable for cleaning. The casing is formed of upper and lower halves substantially equal, with the tank mounted on the lower half, and the upper half covering the tank so as to protect it from the animals and elements. Any suitable means such as the jointed brace 28 may be used for holding the top of the casing in its open position.

What we claim as our invention and desire to secure by Letters Patent is:

1. A stock fountain including a casing having a lower portion and an upper portion hinged to the lower portion to form a top or lid, a tank in said casing mounted rotatably upon the lower portion of the casing, and a trough in the lower portion of the casing under said tank, said tank having an outlet therefrom that is lower than the top of the trough when the tank is turned with the opening downward.

2. A stock fountain including a casing with an opening in the opposite ends thereof near the bottom of the casing, a trough in said openings that is longitudinally slidable into and out of place and with the ends thereof protruding beyond the casing to give stock access to said trough, means for holding said trough in place and a tank in said casing provided with an outlet for the discharging into said trough.

3. A stock fountain including a casing with openings in the opposite ends thereof near the bottom of the casing, a trough removably secured in said openings with the ends thereof protruding beyond the casing to give stock access to said trough, projections on the ends of the casing over the protruding ends of the trough for separating the stock while using the trough, and a tank in said casing provided with an outlet for the discharging into said trough.

In witness whereof, we have hereunto affixed our signature in the presence of the witnesses herein named.

ORA N. McCORMICK.
WILLIAM A. CORTNER.

Witnesses:
TILMAS THORNBURG,
CHARLES L. THORNBURG.